Figure 1:
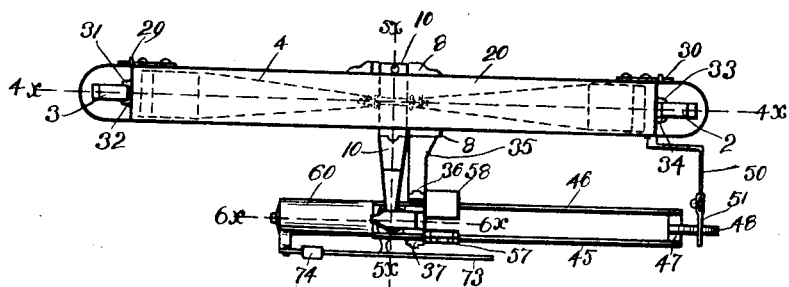

C. E. BURNETT.
SCALE ATTACHMENT FOR SUPPORTING WAGON BEDS.
APPLICATION FILED APR. 29, 1912.

1,113,931.

Patented Oct. 13, 1914.
4 SHEETS—SHEET 1.

Witnesses
Lena M. Ash
Eric Ischinger

Inventor
Charles E. Burnett
By Frank Keith
Attorney

C. E. BURNETT.
SCALE ATTACHMENT FOR SUPPORTING WAGON BEDS.
APPLICATION FILED APR. 29, 1912.
1,113,931.
Patented Oct. 13, 1914.
4 SHEETS—SHEET 2.
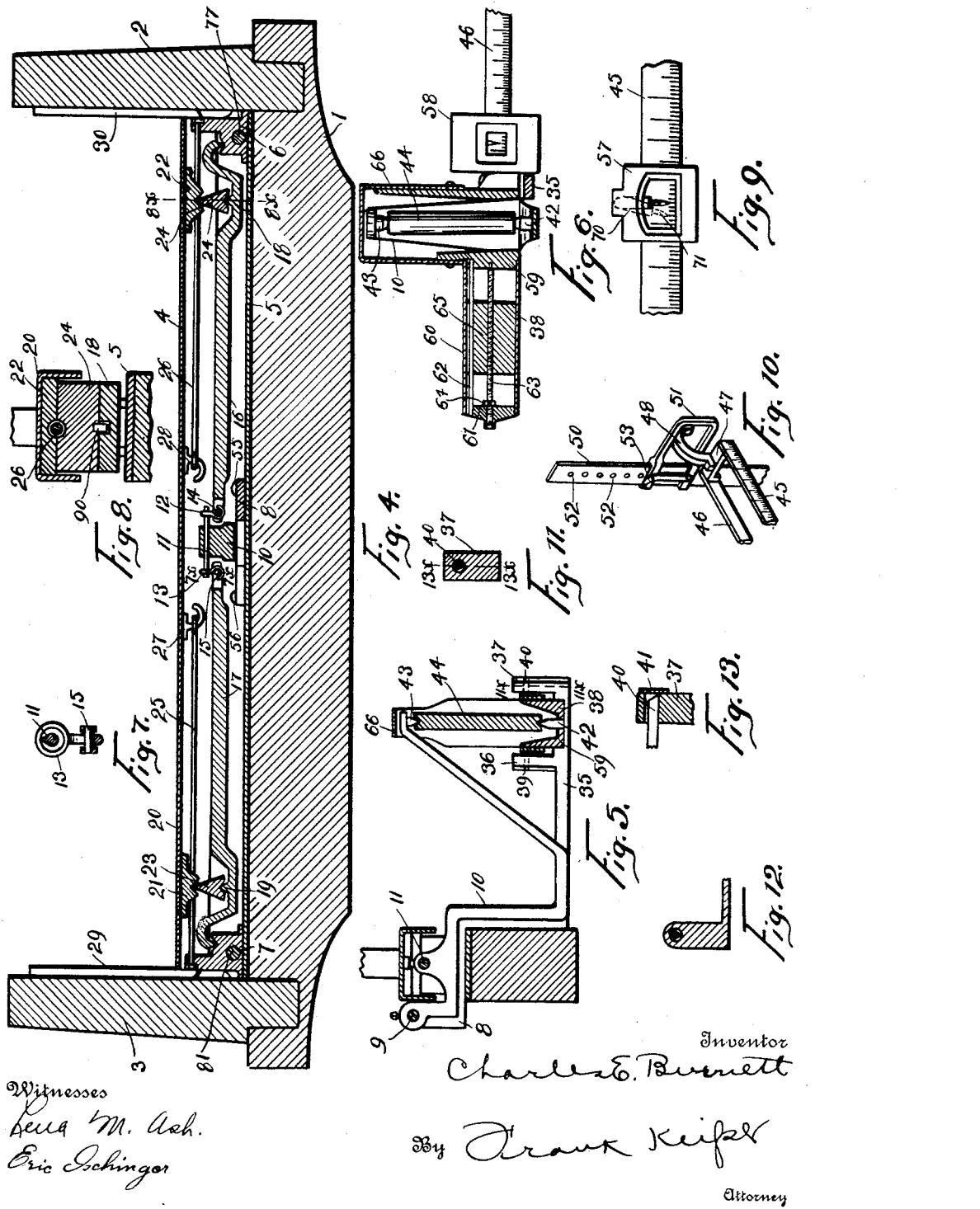

C. E. BURNETT.
SCALE ATTACHMENT FOR SUPPORTING WAGON BEDS.
APPLICATION FILED APR. 29, 1912.

1,113,931.

Patented Oct. 13, 1914.

4 SHEETS—SHEET 3.

Witnesses
Lena M. Ash.
Eric Ischinger

Inventor
Charles E. Burnett
By Frank Keifer
Attorney

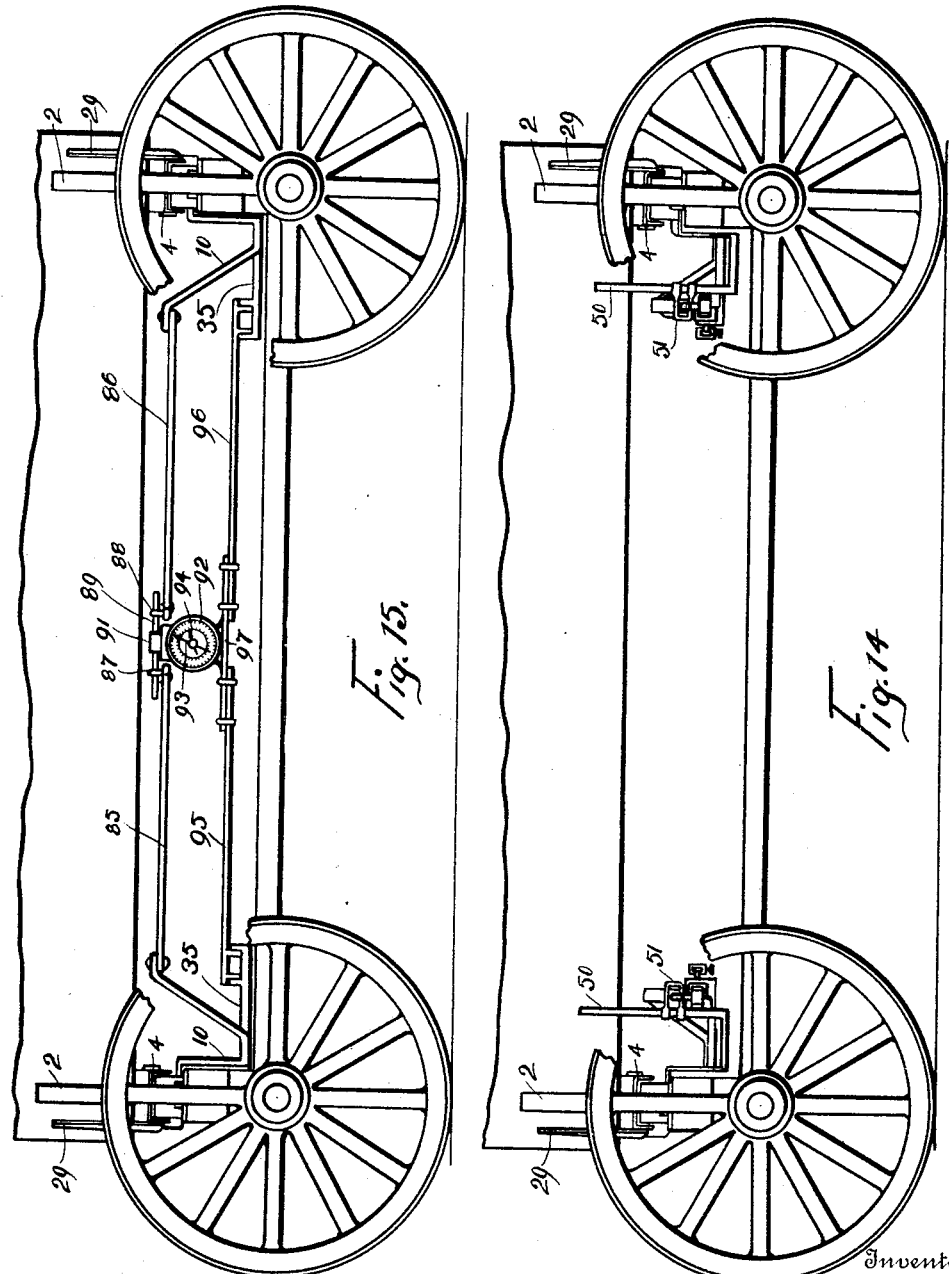

UNITED STATES PATENT OFFICE.

CHARLES E. BURNETT, OF NORTH ROSE, NEW YORK, ASSIGNOR OF ONE-FOURTH TO CASSIUS M. CLAPP, ONE-FOURTH TO THOMAS B. WELCH, AND ONE-FOURTH TO MERRITT E. NEWBERRY, OF NORTH ROSE, NEW YORK.

SCALE ATTACHMENT FOR SUPPORTING WAGON-BEDS.

1,113,931.  Specification of Letters Patent.  Patented Oct. 13, 1914.

Application filed April 29, 1912.  Serial No. 694,035.

*To all whom it may concern:*

Be it known that I, CHARLES E. BURNETT, a citizen of the United States, residing at North Rose, in the county of Wayne and State of New York, have invented certain new and useful Improvements in Scale Attachments for Supporting Wagon-Beds, of which the following is a specification.

The object of my invention is to provide a scale mechanism for an ordinary wagon which can be easily interposed between the wagon bed and the bolsters which support the wagon bed, which scale mechanism can be easily thrown into and out of operation at will, whereby the weight of the load on the wagon may be readily ascertained.

Another object of my invention is to construct the scale mechanism in such a manner that it may be readily fitted to the bolsters of an ordinary wagon and interposed between them and the wagon bed.

Another object of my invention is to construct it so as to accommodate springs interposed therebetween and the wagon bed.

Another object of my invention is to construct the scale mechanism so as to insure the accurate operation thereof whether the wagon is in a true horizontal position or is tilted up sidewise.

These and other objects of my invention will be fully illustrated in the drawings, described in the specification and pointed out in the claims at the end thereof.

Figure 2:
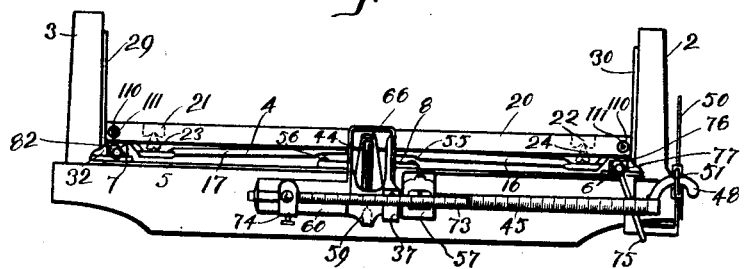
Figure 3:
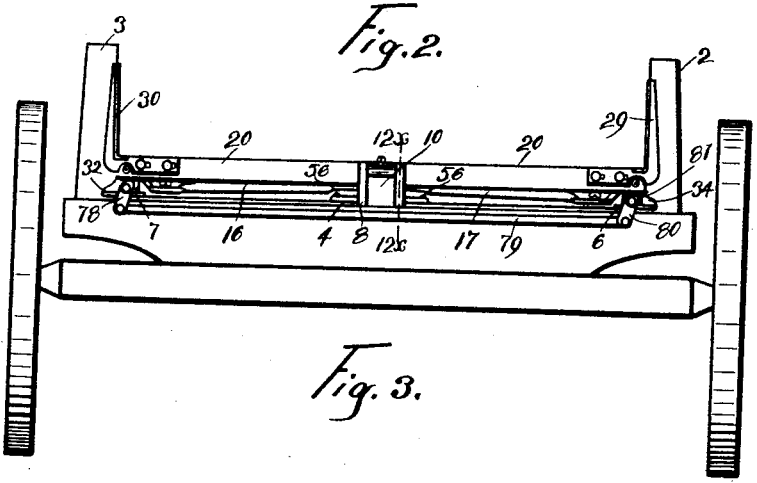
Figure 16:
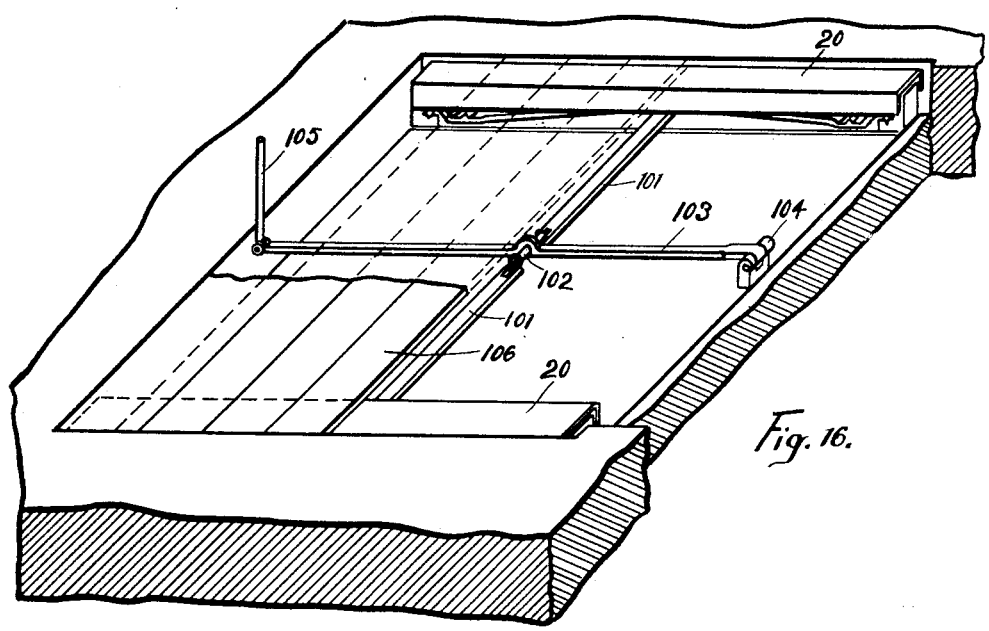
Figure 17:
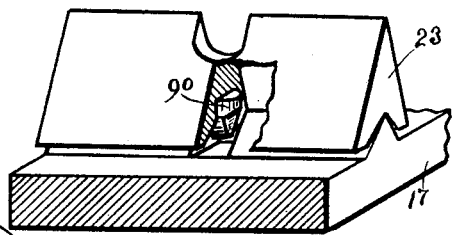
Figure 18:
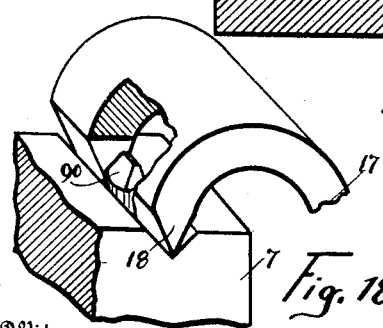

In the accompanying drawings, Figure 1 is a top plan view of my improved scale mechanism, mounted on a wagon bolster. Fig. 2 is a side elevation of the scale mechanism mounted on a wagon bolster. Fig. 3 is a side elevation of the scale mechanism, the wagon bolster and the axle and wheels of the wagon. Fig. 4 is a vertical section on the line $4^x$—$4^x$ in Fig. 1. Fig. 5 is a vertical section on the line $5^x$—$5^x$ in Fig. 1. Fig. 6 is a vertical section on the line $6^x$—$6^x$ in Fig. 1. Fig. 7 is a vertical section on the line $7^x$—$7^x$ in Fig. 4. Fig. 8 is a vertical section on the line $8^x$—$8^x$ in Fig. 4. Fig. 9 is a detail view of one of the scale beams, rider and gravity pointer therefor. Fig. 10 is a perspective view of the locking device for the scale beam. Fig. 11 is a vertical section on the line $11^x$—$11^x$ in Fig. 5. Fig. 12 is a vertical section on the line $12^x$—$12^x$ in Fig. 3. Fig. 13 is a vertical section on the line $13^x$—$13^x$ in Fig. 11. Fig. 14 is a side elevation of a wagon provided with my improved scale mechanism on the front and rear bolsters. Fig. 15 is a side elevation of a modified form of my improved scale mechanism applied to the wagon bolsters. Fig. 16 is a perspective view of my scale mechanism adapted to a stationary platform scale. Fig. 17 is a detail view of one of the loose bearings, showing the retaining pin 90. Fig. 18 is a perspective view of the end of one of the scale levers 16 or 17, showing the pin for holding it in line with the fulcrum.

In the accompanying drawings, like reference characters refer to like parts.

In the accompanying drawings reference numeral 1 indicates a wagon bolster having the stakes 2, 3 thereon. On this wagon bolster is placed my improved scale mechanism 4. This scale mechanism is built on the bed plate 5, on the opposite ends of which are fulcrums 6 and 7, said fulcrums being rigidly fastened to the bed plate. Also fastened to the bed plate is the bracket 8, which bracket at its top carries the fulcrum for the knife edge 9 which is fastened to the transverse lever 10. Mounted in the transverse lever 10 is the knife edge 11, on the opposite ends of which are hung the stirrups 12 and 13 from the lower hooked ends of which is hung the knife edges 14 and 15 which are carried in the ends of the levers 16 and 17. Each of these levers near the fulcrums 6 and 7 carries the knife edges 18 and 19. Mounted immediately over the bed plate 5 is the supporting plate 20, on the opposite ends of which are fastened the fulcrums 21 and 22. Interposed between the fulcrums 21 and 22 and the knife edges 19 and 18 on the levers are the loose bearings 23 and 24. By means of these bearings and the fulcrums the supporting plate 20 is supported by the bottom plate 5. Rigidly fastened in each of the loose bearings 23 and 24 is a pin 90 which engages loosely with a corresponding recess in the knife edges 18 and 19 on the levers, by which the loose bearings are held against lateral displacement. The bottom end of the pin 90 is beveled, as is shown in Fig. 8, the pin otherwise being cylindrical in shape. Each of the fulcrums 6 and 7 is extended upward and has fastened thereto the tie rods 25 and 26, which tie rods in turn engage with the hooks 27 and 28 on the under side of the supporting plate 20, by which the supporting plate is prevented from moving sidewise against the upright stakes, but which rods do not interfere with its up and down movement.

Rigidly mounted on the supporting plate 20 are the stakes 29 and 30, which stakes are adapted to move up and down with the supporting plate. The stakes 29 and 30 are placed out of line with the stakes 3 and 2, as is shown in Fig. 1, so that in their up and down movement they cannot rub against the stakes 3 and 2, and they also hold the wagon bed from making contact with the stakes 3 and 2. The bed plate 5 has the lugs 31, 32, 33 and 34 thereon, with which it engages the stakes 3 and 2 and by which it is held firmly in place on the bolster. As is shown in Fig. 3, the stakes 29 and 30 are fastened to the side of the top plate 20 and are adjustable in and out so as to snugly fit the sides of the wagon bed that may be placed thereon.

Rigidly fastened to the base plate 5 is the bracket 35 on which are provided the lugs 36 and 37, between which is supported the scale beam 38, the scale beam having the knife edges 39 and 40 thereon which project sidewise and engage with suitable openings in the lugs 36 and 37, which act as a fulcrum therefor. A longitudinal section through the preferred form of knife edges used in my scale is shown in Fig. 13, in which the outer end of the knife edge 40 is beveled to a point. On the outside of the lug 37 is placed the cover plate 41 by which the knife edge 40 is held against sidewise movement, the end of the knife edge being tapered to a point so that if it makes contact with the cover plate the friction between it and the cover plate will be reduced to a minimum so that the accurate operation of the scale will not be sensibly interfered with.

Rigidly mounted in the scale beam at 38 is the pin point 42. Rigidly mounted on the end of the transverse lever 10 is a similar pin point 43 between which pin points is placed the pin 44, having cone shaped recesses therein which are engaged by the pin points 42 and 43. The transverse lever 10 is depressed by the weight on the supporting plate 20 through the scale levers 16 and 17 as above described, and it in turn presses down upon the pin 44 on the left hand end of the scale beam 38, as is shown in Fig. 6, causing the scale beam to rock around the fulcrums in the lugs 36 and 37. The scale beam projects on both sides of the fulcrum 35 as is illustrated in Fig. 6, and on the forward side of the fulcrum is provided with the graduated scale beams 45 and 46, which scale beams are connected together at their forward ends by the yoke 47 having the bracket 48 thereon.

Mounted on the bed plate 5 is the bracket 50 carrying the yoke 51 mounted to slide thereon. The bracket 50 is perforated at 52, 52 and the yoke 51 carries a spring 53 thereon having a pin which engages with the holes 52 and by which the yoke may be held at any desired elevation. As shown in Fig. 10 it is in the preferred position which it will occupy when the scale is in balance, and it may be raised to the top of the bracket 50 when the scale is not in use, for the purpose of taking the load on the levers 16 and 17 off of the knife edges 14 and 15, permitting the levers 16 and 17 to rest directly upon the lugs 55 and 56, and also taking the knife edges of the scale beam off of their support by causing the scale beam as it rocks around them to strike the bracket 35, causing the knife edges 39 and 40 to be lifted from out of contact with the supporting surfaces in the lugs 36 and 37. After making contact with the bracket 35 it will move around the upper left hand corner of the bracket 35 as a center, the relation of the parts being shown in Fig. 6. When the scale beam is moved to this position the riders 57 and 58 will gravitate toward the left hand end of the graduated scales 45 and 46, as shown in Fig. 1, and stay in that position.

As shown in Figs. 1, 2 and 6, my scale beam is provided with a counterbalance, the construction of which I will now explain. The central portion of the scale beam is a casting 59, on one side of which are fastened the graduated scales 45 and 46, and on the other side is fastened the cylindrical casing 60 which houses the counterbalance. In the end of the cylindrical casing is a head 61, between which and the casting 59 extends the guide rod 62. Passing through the head 61 is the screw 63 which has a stepped bearing in the casting 59 at the forward end thereof. A dog 64 engages with the recess in the screw 63, by which the endwise movement of the screw is prevented as the screw is rotated. As shown in Fig. 6, the head 61 completely encircles the head of the screw, so that nothing but a screw driver can be used for the purpose of turning the screw, thus protecting the screw from improper manipulation. Mounted to slide in the casing is the counterbalance weight 65 which has a slotted engagement with the rod 62 and which has a threaded engagement with the screw 63. The slotted engagement with the rod 62 prevents the weight 65 from turning, and as the screw 63 is turned, the weight 65 is advanced or retracted along the screw. In this way the adjustment of the counterbalance is secured. The casting 59 has a hood 66 fastened thereto which extends up over the outer end of the transverse lever 10, protecting it from impact from above and also preventing it from being lifted improperly out of engagement with the pin 44. Mounted on the graduated bar 46 is the rider 58 having a stationary pointer thereon. Mounted on the graduated bar 45 is the rider 57 having the swinging or pivoted pointer 70 therein. This pointer is pivoted so that it will normally hang plumb by gravity. The lower end of the pointer consists of a pin 71 having a threaded engagement with the upper part of the pointer 70, by which it can be adjusted in and out and left free for further adjustment, or in which it can be fastened rigidly by brazing or soldering, etc., after the adjustment has been completed. The object of this pivoted pointer I am now about to explain.

To secure the accurate working of the scale it would ordinarily be necessary to have the wagon bed and supporting bars of the scales horizontal, but it is not always easy to get the wagon on an even keel and it may sometimes be necessary therefore to use the scale mechanism when the wagon is slanted sidewise. I have found by actual test that in such cases the riders on the scale beam do not accurately indicate the weight on the wagon, and I have provided the pivoted pointer in the rider 57 for the purpose of correcting such inaccuracy, so that the pivoted pointer will correctly indicate the weight on the wagon. The length of the pointer must be determined by experiment and bears a fixed ratio to the length between consecutive graduations on the scale beam. When the wagon is tilted sidewise so that the scale beams are pointed upward, the pointer 70 will point backward and subtract the necessary correction from the indication on the graduated scale, and when the scale beam is pointed downward the pointer will swing forward and add the necessary correction to the indication of the rider, it being understood in either case that the rider must be moved until the scale beam is in balance, which balance it will take when it is either horizontal or pointing up or pointing down. I have provided only one of the riders with a swinging pointer, it being deemed unnecessary to provide the other riders therewith, as the whole correction can be made on a single rider. The graduated scale 46 has the large graduations thereon, the graduated scale 45 has the intermediate graduations thereon, and the small graduations are provided on a third scale 73, shown in Figs. 1 and 2, on which is provided the rider 74.

As shown in Figs. 2 and 3 I provide mechanism for taking the load off of the knife edges 18 and 19 by raising the supporting plate 20. This mechanism comprises the lever 75 having a cam 76 on the end thereof, the lever being provided on a rock shaft 77 which extends through the fulcrum plate 6 and has the lever 78 keyed thereto on the opposite side. Connected to the lever 78 is the connecting rod 79, which in turn connects with a lever 80 mounted on a shaft 81 which extends through the fulcrum block 7 and has a cam 82 thereon. The levers 75, 78 and 80 all have cams on the upper ends thereof and all of these cams, together with the cam 82, move in unison upon the operation of the lever 75 to raise the supporting plate 20 off of its knife edges. The operation of these cams is materially facilitated by placing the scale beam in its horizontal position. This slightly raises the supporting plate 20 off of the cams, permitting them to be turned down out of the way so as not to interfere with the further travel of the plate. As is illustrated in Figs. 1 to 14 inclusive, the scale mechanism is designed and used separately for each wagon bolster, the weight being taken on each of the scale mechanisms and added together in order to get the total indication.

In Fig. 15 I have shown the construction by which the combined effect of both the scale mechanisms may be indicated by a single indicating device. In this case the arms 85 and 86 are fastened to the transverse levers 10 and are positively moved thereby. At their ends these arms carry stirrups 87 and 88 which engage with a rod 89 supported by the plunger 91, forming part of the indicating mechanism 92. The motion of this plunger is communicated to the hand 93 on the dial 94, so that in proportion as the plunger 91 is depressed, the hand is rotated and will indicate the correct weight on the two bolsters. The bar 89 serves to equalize the motion communicated by the arms 85 and 86 to the plunger 91, so that the correct indication is secured thereby. The bar 89 may be of any desired length but the length of the arms 85 and 86 must remain fixed, and in this way the length between the centers of the bolsters can be increased or decreased as it is found necessary to lengthen or shorten up the running gear of the wagon. The dial mechanism is supported by the adjustable bars 95 and 96 which are supported by the brackets 35 and are coupled together by the bar 97 with which they have an adjustable engagement, permitting the lengthening or shortening thereof as may be desired. Instead of the dial mechanism above described, the scale beam may be supported on fulcrums carried on the frame 96, which scale beam can be acted on by the plunger 91 for the purpose of indicating the correct weight carried by the wagon. The levers 10 are shaped as is indicated in Figs. 5 and 15 to permit the use of springs on the wagon, such springs being shown in my prior Patent 1,017,244.

In Fig. 16 I have shown a modification by which the scale mechanism is adapted to a platform scales. In this case the bars 101 are substituted for the transverse levers 10. The bars 101 are connected to the evening bar 102, which in turn is connected to the lever 103 which is fulcrumed at 104 and to the free end thereof has connected the link 105 which may be connected to the scale beam of the scales. Planks 106 may be laid upon the supporting plates 20 to furnish a platform for receiving the commodity to be weighed on the scales. The mechanism under the supporting plates 20 is otherwise substantially the same as that shown in cross section in Fig. 4. A pin similar to the pin 90 is used between the fulcrums 6 and 7 and the levers 16 and 17 to hold said levers against sidewise movement upon their fulcrums. The supporting plate 20 has the shape of a channel, as is illustrated in cross section in Fig. 8. The sides of this channel are perforated at 110, as shown in Figs. 2 and 3, for pins 111 to be inserted into the fulcrums 6 and 7 for the purpose of holding the supporting plate 20 loosely in position.

While the scales herein shown are especially adapted to portable use in connection with wagons, it is also evident that they are adapted to portable use in many other ways and in many other connections as well, and in all such cases where it is necessary to compensate for the scale being out of the horizontal, the rider with a pivoted pointer therein and all the other details of my construction are especially useful, and the use for any of such or other purposes is all included within the spirit and scope of my invention.

Having thus described my invention, what I claim as new and patentable is as follows:

1. The combination in a scale attachment for a wagon of a base plate, a supporting plate extending parallel to said base plate, scale levers interposed between said supporting plate and the base plate for the purpose of supporting the supporting plate, fulcrums supporting said levers, mounted at the ends of the base plate, tie rods connecting the supporting plate to the fulcrums on the base plate and preventing the lateral movement of the supporting plate without interfering with its vertical movement.

2. The combination in a scale attachment for a wagon of a base plate, fulcrums fastened at the ends thereof, scale levers fulcrumed thereon and extending toward each other, a supporting plate mounted over said base plate and having fulcrums thereon, knife edges on said scale levers and loose bearings interposed between said knife edges and said fulcrums, tie rods fastened in said first named fulcrums and extending toward each other, passing loosely between the second named fulcrums and the loose bearings, hooks on the supporting plate to which said tie rods are fastened.

3. The combination in a scale attachment for supporting wagon beds, of a base plate, a supporting plate over said base plate, scale levers, fulcrums and knife edges interposed between the supporting plate and base plate supporting the supporting plate from the base plate, upright stakes clamped near the ends of the supporting plate and adjustable along the supporting plate toward and away from each other.

4. The combination in a scale attachment for a wagon of a base plate, scale levers mounted thereon and extending toward each other, a bracket on said base plate, a scale lever pivotally mounted on said base plate and extending between and transversely to said scale levers and being connected thereto, said bracket and said transverse lever extending downwardly from said base plate, a scale beam mounted to swing in said bracket, said transverse lever extending downwardly from the base plate and then up over said scale beam, a pin interposed between the end of said transverse lever and said scale beam whereby the movement of the transverse lever is communicated to the scale beam.

5. The combination in a scale attachment for a wagon of a base plate, scale levers mounted thereon and extending toward each other, a bracket on said base plate, a scale lever pivotally mounted on said base plate and extending between and transversely to said scale levers and being connected thereto, said bracket and said transverse lever extending downwardly from said base plate, a scale beam mounted to swing in said bracket, said transverse lever extending downwardly from the base plate and then up over said scale beam, a pin interposed between the end of said transverse lever and said scale beam whereby the movement of the transverse lever is communicated to the scale beam, said bracket and said lever being so shaped as to avoid and pass around the springs or other member of the wagon construction.

6. The combination in a scale mechanism for supporting a wagon bed of a base plate, scale levers fulcrumed thereon, a supporting plate above said base plate, fulcrums on said supporting plate, knife edges on said supporting levers, loose bearing blocks interposed between said fulcrums and said knife edges, a pin rigid with said bearing block engaging loosely with the knife edge bearing thereon to hold said parts in register with each other, said knife edge being recessed to receive said pin.

7. The combination in a scale mechanism for supporting a wagon bed of a base plate, scale levers fulcrumed thereon, a supporting plate above said base plate, fulcrums on said supporting plate, knife edges on said supporting levers, loose bearing blocks interposed between said fulcrums and said knife edges, a pin rigidly mounted in the fulcrum engaging loosely with the knife edge on the lever, said knife edge being recessed to receive said pin.

8. The combination in a scale attachment for a wagon of a graduated scale beam, a rider mounted to slide thereon, a swinging pointer mounted in said rider and pointing to the graduations on said beam.

9. The combination in a scale attachment for a wagon of a base plate, a supporting plate extending parallel to said base plate, scale levers interposed therebetween, a graduated scale beam connected to and operated by said scale levers, a bracket adjacent to the end of the scale beam having a yoke thereon, the end of said scale beam projecting into and swinging free in said yoke, said yoke being adjustably mounted vertically on said bracket to raise the end of said scale beam and make the scale inoperative.

10. The combination in a scale attachment for a wagon of a base plate having fulcrums at each end thereof, a supporting plate extending parallel to said base plate, scale levers interposed therebetween, said supporting plate having depending flanges thereon extending over said fulcrums, perforations in said flanges, pins loosely passing through said perforations into said fulcrums for the purpose of retaining the supporting plate in position.

11. The combination in a scale attachment for a wagon of a base plate, a supporting plate extending parallel to said base plate, said supporting plate having fulcrums on the bottom thereof, knife edges and scale levers interposed between said supporting plate and the base plate for the purpose of supporting the supporting plate, tie rods connecting the supporting plate to the base plate and preventing the lateral movement thereof without interfering with its vertical movement, said tie rods being placed end to end and in line with each other and extending between the fulcrum of the supporting plate and the knife edge supporting it.

12. The combination in a scale attachment for a wagon of a graduated scale beam, a pivotal support therefor, a rider mounted to slide on said beam on one side of said support and a counterbalance provided on said beam on the other side of said support, said counterbalance comprising a housing, a weight adapted to slide along said housing, means to prevent said weight from turning therein, a screw mounted to rotate in said housing and held against longitudinal movement, said screw having a threaded engagement with said counterbalance weight, said screw being completely inclosed in said casing and having its projecting end protected by a surrounding ferrule.

13. The combination in a scale mechanism for supporting a wagon bed of a base plate, scale levers fulcrumed thereon, a supporting plate above said base plate, fulcrums on said supporting plate, knife edges on said supporting levers, loose bearing blocks interposed between the fulcrums on the supporting plate and the knife edges on the scale levers, said bearing blocks standing normally substantially perpendicular to the supporting plate, means for retaining said bearing blocks in their perpendicular relation to said supporting plate.

14. The combination in a scale mechanism for supporting a wagon bed of a base plate, scale levers fulcrumed thereon, a supporting plate above said base plate, fulcrums on said supporting plate, knife edges on said supporting levers, loose bearing blocks interposed between the fulcrums on the supporting plate and the knife edges on the scale levers, said bearing blocks standing normally substantially perpendicular to the supporting plate, means for retaining said bearing blocks in their perpendicular relation to said supporting plate, said means including tie rods placed between the base plate and supporting plate, preventing the lateral movement of the supporting plate with relation to the base plate.

15. The combination in a scale attachment for a wagon of a base plate, a supporting plate extending parallel to said base plate, knife edges and scale levers interposed between said supporting plate and the base plate for the purpose of supporting the supporting plate, tie rods connecting the supporting plate to the base plate and preventing the lateral movement of the supporting plate on the base plate without interfering with its vertical movement, said tie rods being placed in line with each other and being directly opposed to each other and tending to hold the supporting plate rigidly in position.

In testimony whereof I affix my signature in presence of two witnesses.

CHARLES E. BURNETT.

Witnesses:
C. M. CLAPP,
RAY B. BILLINGS.

---

Copies of this patent may be obtained for five cents each, by addressing the "Commissioner of Patents, Washington, D. C."